United States Patent [19]
Onishi et al.

[11] Patent Number: 5,728,398
[45] Date of Patent: Mar. 17, 1998

[54] FEED ADDITIVE FOR SOWS

[75] Inventors: Norimasa Onishi, Kawasaki; Yasuhiko Toride, Tokyo; Akinori Uehara, Kawasaki; Ei-ichi Kokue, Kokubunji, all of Japan

[73] Assignee: Ajinomoto Co., Inc., Tokyo, Japan

[21] Appl. No.: 745,190

[22] Filed: Nov. 7, 1996

Related U.S. Application Data

[63] Continuation of Ser. No. 317,360, Oct. 4, 1994, abandoned.

[30] Foreign Application Priority Data

Oct. 5, 1993 [JP] Japan .................. 5-249405

[51] Int. Cl.$^6$ .................. A23K 1/165; A23K 1/17
[52] U.S. Cl. .................. 424/442
[58] Field of Search .................. 424/442

[56] References Cited

U.S. PATENT DOCUMENTS

| | | | |
|---|---|---|---|
| 3,686,392 | 8/1972 | Hamada et al. | 424/16 |
| 4,362,710 | 12/1982 | Watanabe | 424/14 |
| 4,919,936 | 4/1990 | Iwanami et al. | 424/442 |
| 5,153,309 | 10/1992 | Fitzhugh | 530/333 |

FOREIGN PATENT DOCUMENTS

| | | |
|---|---|---|
| 0 320 320 | 6/1989 | European Pat. Off. . |
| 0 342 111 | 11/1989 | European Pat. Off. . |
| 0 416 892 | 3/1991 | European Pat. Off. . |
| 0564704A1 | 11/1992 | European Pat. Off. . |
| 0 564 704 | 10/1993 | European Pat. Off. . |
| 1193191 | 5/1970 | United Kingdom . |

OTHER PUBLICATIONS 713857 (Chem Abstract) Aug. 31, 1993, Belguim, UPAB.

Schweinewelt, vol. 12, No. 1, pp. 5–8, Jan./Feb. 1987, Dr. Dietrich Kahrs, "Toyocerin In Der Schweineproduktion".

Database WPI, Derwent Publications, AN–77–78084Y, JP–50–126872, Oct. 6, 1975.

*Primary Examiner*—Joseph L. Schofer
*Assistant Examiner*—Sharon Howard
*Attorney, Agent, or Firm*—Oblon, Spivak, McClelland, Maier & Neustadt, P.C.

[57] ABSTRACT

A feed additive for sows containing, as an active ingredient, a reduced form of folic acid. Included are 7,8-dihydrofolic acid, leucovorin, liver powder, disrupted cells or cell extract of a microorganism, etc.

6 Claims, No Drawings

FEED ADDITIVE FOR SOWS

This application is a Continuation of application Ser. No. 08/317,360, filed on Oct. 4, 1994, now abandoned.

BACKGROUND OF THE INVENTION

1. Field of the Invention

The present invention relates to a feed additive for sows which contains, as active ingredient, a reduced form of folic acid. The additive increases the quantity of reduced folic acid in the blood plasma of sows and, as a result, improves their breeding efficiency. The invention also relates to a feed for sows containing the feed additive, and to a method of feeding sows and improving their breeding efficiency.

2. Description of the Prior Art

Folic acid is a coenzyme participating in the synthesis of amino acids, such as methionine, serine and glutamic acid, and purine bases of the nucleic acids constituting DNAs. Epidemiological surveys on pregnant women and tests on pregnant guinea pigs have confirmed that the demand for folic acid increases, and its concentration in blood plasma decreases, in mother's bodies during pregnancy. See Pritchard J. A. et al., Am. J. Obst. Gynecol., Vol. 104, p. 388 (1969) and Habibzadeh H. C. et al., Br. J. Nutr., Vol. 55, p. 23 (1986) both incorporated herein by reference.

It has also been confirmed that in domestic pigs that the amount of reduced folic acids in the blood plasma of sows decreases during pregnancy. See Natsuhori et al., Final Program and Abstracts Book of the 10th International Symposium: "Chemistry and Biology of Pteridines and Flates," p.196 (1993) incorporated herein by reference. It has also been shown that breeding efficiency can be improved by administering folic acid (an oxidized form) to pregnant pigs by means of intramuscular injection. See Matte J. J. et al., J. Anim. Sci., Vol. 67 p. 426 (1989) and Friendship R. M. et al., Can Vet. J., Vol. 32, p.564 (1991), both incorporated herein by reference.

However, administering folic acid to sows via intramolecular injection is difficult from a practical viewpoint, particularly on large farms, and the preferred method of administering folic acid to pregnant pigs is by means of feed addition (i.e.; oral administration). A number of investigations have already been made on the improvement of breeding efficiency based on oral administration. However, some consider the administration effective [See Thaler R. C. et al., J. Anim. Sci., Vol. 67, p. 3,360 (1989), Lindemann M. D. et al., J. Anim. Sci., Vol. 67, p. 459 (1989) and Lindemann M. D. et al., J. Anim. Sci., Vol. 71, p. 239 (1991) all incorporated herein by reference], while others are skeptical about its effects [See Easter R. A. et al., Nutrition Reports International, Vol. 28, p. 945 (1983) and Matte J. J. et al., Livestock Production Science, Vol. 33, p. 131 (1992) both incorporated herein by reference]. There is no clear conclusion on the effects of oral administration to sows of an oxidized form of folic acid.

In general, folic acid is chemically synthesized. Chemically synthesized folic acid is of an oxidized form, and the oxidized form of folic acid per se does not function as a coenzyme. Usually, after being absorbed into the body, it is transformed by dihydrofolic acid dehydrogenase into 7,8-dihydrofolic acid, which is then enzymatically reduced into reduced forms of folic acid such as tetrahydrofolic acid (THF) or 5-methyltetrahydrofolic acid (5MF) to express their function as coenzymes. Therefore, the effects obtained by the administration of folic acids to an animal can be determined by measuring the amount of THF or 5MF in blood plasma. However, it is not possible to determine reduced forms of folic acid alone in a selective manner by the prior determination method since it is based on the radioligand technique, and hence it is not possible to obtain an accurate value of reduced forms of folic acid contained in blood plasma. In the present specification, reduced forms of folic acid are referred to as "active-type folic acids" since they have physiological activities, and oxidized forms of folic acid are referred to as "inactive-type folic acids" since they have no physiological activities.

For the purpose of analyzing the effects of administering folic acids to pigs, the HPLC-ECD method has been developed recently for determining the content of active-type folic acids in blood plasma by high performance liquid chromatography using an electrochemical detector, and, by using this method, investigations have been made regarding the extent of appearance of THF and 5MF in blood plasma at the time when folic acid (an oxidized form) is administered to pigs by intravenous injection, intramuscular injection or oral administration.

In particular, 4 grown pigs having a body weight of approximately 25 kg were distributed according to the Latin square method to 4 factors: intravenous injection (1 mg/kg of body weight), intramuscular injection (1 mg/kg of body weight), small dosage oral administration (1 mg/kg of body weight) and large dosage oral administration (50 mg/kg of body weight), all of folic acid (an oxidized form), and tests were performed. As a result, the concentration of THF and 5MF in blood plasma increased in cases of intravenous injection, intramuscular injection and large dosage oral administration. Accordingly, it is considered that the administered folic acid (an oxidized form) were absorbed and converted to active-type folic acids in the liver, etc. On the other hand, THF and 5MF did not appear in blood plasma in cases of small dosage oral administration. With regard to the above, see Eiichi Kokue et al., "Abstract Book of the 113th Convention of Japan Veterinary Society," p. 112 (1992) incorporated herein by reference. In rats the concentration of reduced forms of folic acid increase rapidly even when an oxidized form of folic acid is administered in small dosages [See Tsunematu K. et al., Cong. Anom., Vol. 30, p. 113 (1990) incorporated herein by reference].

From the above-data it is generally considered true that pigs possess the capability of converting inactive-type folic acids to active-type folic acids, but their ability to absorb inactive-type folic acids from their digestive tract is far lower than in rats. It has also been found that an extremely large quantity of inactive-type folic acids must orally be administered to pigs in order to increase the value of active-type folic acids in their blood plasma.

3. Objects of the Invention

The present invention has been made in view of the above prior art. Accordingly, one of its objects is to provide a feed additive for sows which is capable of increasing the concentration of reduced forms of folic acid in their blood plasma and, as a result, of improving breeding efficiency. Another object is to provide a feed for sows which improves breeding efficiency comprising this additive. Yet another object of the present invention is to provide a method of feeding sows that improves breeding efficiency. These and other objects will become apparent as the invention becomes better understood by reference to the following description of preferred embodiments.

DESCRIPTION OF THE PREFERRED EMBODIMENTS

The present inventors have discovered that the concentration of reduced forms of folic acid in the blood plasma of pigs can be increased by adding a reduced form of folic acid to their feed and by administering it orally to sows, and have completed the present invention on the basis of this finding.

Accordingly, the present invention is concerned with the improvement of the breeding efficiency of sows through oral administration of a reduced form of folic acid. In a first embodiment of the present invention an additive for direct oral administration or for use in mixture with the feed of sows having as its active ingredient at least one reduced form of folic acid is provided.

As is well known, a plurality of embryos (i.e., multiple embryos) are typically generated upon fertilization in the uterus of sows. However, the multiple embryos so generated are not always all delivered safely. Of course, it is highly desirable from the viewpoint of animal husbandry and the management of pig breeding operations that all of the multiple embryos generated be safely delivered. In the present invention, the expression "breeding efficiency of sows improves" means that the ratio of the number of safely delivered embryos to the total number of embryos generated increases. This occurs when sows are orally administered with the feed additive according to the present invention or when they are fed with feed comprising the feed additive according to the present invention, as compared with cases where they are not so administered or not so fed.

In the present invention, the term "a reduced form of folic acid" means not only reduced folic acid its narrow sense (i.e., pteroyl(mono)glutamic acid), but also other various reduced folic acids (i.e., reduced folic acids in the wider sense). It should be noted that the definition of a reduced form of folic acid includes those reduced forms of folic acid which show physiological activity similar to pteroyl(mono) glutamic acid.

Accordingly, in the present invention, reduced forms of folic acid include 7,8-dihydrofolic acid ($H_2$ folic acid) in which the pteridine ring of folic acid is reduced; $H_4$ folic acids, such as 5,6,7,8-tetrahydrofolic acid ($H_4$ folic acid), 5-formyl-$H_4$-folic acid, e.g. leucovorin [L-(−)-5-formyl-5,6, 7,8-tetrahydrofolic acid], 5,10-methylene-$H_4$-folic acid, 5-methyl-$H_4$-folic acid, 10-formyl-$H_4$-folic acid, 5-methenyl-$H_4$-folic acid, 5-formimino-$H_4$-folic acid, etc. and their derivatives, such as the poly-gamma-glutamic acid derivatives of each $H_4$ folic acid (known as storage-forms of folic acid in liver).

The present invention reduced forms of folic acid can be in the form of liver powders and disrupted cells or cell extracts of microorganisms containing reduced forms of folic acid. Liver is an organ in which the metabolism of various vitamins is performed, and active-type folic acids are contained in the liver in relatively high amounts. However, no cases are known wherein liver powders prepared, e.g., through freeze-drying and pulverization of the livers of pigs or cows, are orally administered to sows to improve their breeding efficiency. That the concentration of THF and 5MF in blood plasma of pigs can be increased by incorporating liver powders into feed is an important aspect of the present invention.

Disrupted cells or cell extracts of a microorganism, yeasts, such as Torula yeast, etc., have been used as a source of vitamins for feed. However, the vitamins are contained in their cells and are absorbed only poorly since they are usually used without disruption of the cell walls. The present inventors have discovered that the amount of THF and 5MF in blood plasma of pigs can be increased by orally administering disrupted cells or a cell extract of a microorganism; namely, products prepared by subjecting the cells of a microorganism to a mechanical disruption treatment, to an enzymatic digestion treatment, or to autolysis, etc., so as to make the reduced forms of folic acid therein into a readily absorbable condition. Accordingly, the breeding efficiency of sows can be improved by administering this product to pregnant sows.

Any microorganisms can be used as the raw material for producing the disrupted cells or cell extract, provided that the products (mechanically disrupted cells or enzymatically disrupted cells, etc.) have a sufficiently high content of reduced forms of folic acid. Specific examples include bacteria, such as *Corynebacterium glutamicum* (former name: *Brevibacterium lactofermentum*) (ATCC 13,869, etc.), *Corynebacterium ammoniagenes* (former name: *Brevibacterium ammoniagenes*) (ATCC 6,871, etc.), *Brevibacterium flavum* (ATCC 13,826, etc.), *Corynebacterium glutamicum* (ATCC 13,032, ATCC 13,060, etc.), *Bacillus subtilis* (ATCC 13,952, IFO 3,009, IFO 13,169, etc.), *Lactococcus lactis subsp. cremoris* (ATCC 19, 257, etc.), and the like; yeasts, such as *Saccharomyces cerevisiae*, (IFO 2,044, IFO 2,375, etc.), *Candida utilis* (former name: *Torulopsis utilis*) (ATCC 9,226, etc.), and the like; and fungi, such as *Aspergillus oryzae* (IFO 30,104, etc.), *Aspergillus niger* (IFO 4,414, etc.), etc.

Any culturing media can be used for the culturing of these microorganisms, provided that nutrients assimilable to the microorganisms are contained therein. For example, ordinary media can be used comprising carbon sources, carbohydrates, such as glucose, sucrose, etc., alcohols, such as ethanol, glycerol, etc., organic acids, such as acetic acid, propionic acid, etc., soybean oils, and mixtures of these; nitrogen-containing organic or inorganic nutrients, such as yeast extract, peptone, meat extract, corn steep liquor, ammonium sulfate, ammonia, etc.; inorganic nutrients, such as phosphates, magnesium, iron, manganese, potassium, etc.; and vitamins, such as biotin, thiamine, etc.

For culturing, conditions typically employed for the culturing of microorganisms can be used without any modifications. For example, the microorganisms can be cultured in a nutrient medium at 20° to 40° C. at a pH in the range of 4.0 to 9.5 for a period of 20 hours to 5 days.

The amount of reduced forms of folic acid produced in the cells of a microorganism obtained by culturing may be increased by adding p-aminobenzoic acid, an oxidized form of folic acid, and/or a nucleic acid in the culture medium. The nucleic acid used preferably contains guanosine, inosine, xanthine, 5'-guanilic acid, 5'-inosinic acid, 5'-xanthylic acid, guanosine-5'-diphosphate, and guanosine-5'-triphosphate. These additives are added in an amount sufficient to increase the amount of reduced forms of folic acid produced in the cells, in comparison with cases where the additives are not added; for example, in an amount of 1 mg/liter to 1 g/liter, preferably 10 to 100 mg/liter. If the amount added is too small, no beneficial effect will be obtained, whereas if too much is added, the growth of the microorganism may be inhibited.

The cells thus obtained by culturing are subjected to disruption or extraction treatment optionally after being separated from the culture liquid by any appropriate art recognized method. The culture can be subjected to disruption or extraction treatment immediately or after concentration, and, if the culture does not affect the performance of the disruption treatment the ingredients of the culture medium may also be orally administered to the sows along with the disrupted cells. Furthermore, the cells subjected to disruption or extraction can be live cells or killed cells.

There is no particular restriction on the method used for disruption of the cells. For example, disruption can be performed by known mechanical methods, as well as by a method utilizing enzymes. Several mechanical methods can be carried out in concert. For example, the cells of a microorganism can be disrupted with glass beads by using a "Beads Beater" (manufactured by Biospec Co.), or the disruption of the cells can be performed with pressure, or can be carried out by using an ultrasonic disrupter. Also, in the case where the cells of a microorganism are disrupted by an enzyme, the method can be carried out in concert with other known methods. For example, after the cultured cells have been subjected to heat sterilization treatment, a cell wall digesting enzyme is added thereto to decompose the cell walls of the microorganism. Any enzyme can be used, provided that it is capable of digesting and disrupting cell walls. Well-known enzymes such as lysozymes, proteases, zymolyases, and the like, are typical examples of the enzymes having such capability. The enzymatic treatment can be carried out under known conditions. There is also no particular restriction on the method of extraction of the cells. For example, the extraction can be performed by autolysis or by heating the cells in hot water at a temperature of between 90° C. and 120° C.

The thus prepared disrupted cells or cell extract can be orally administered either as they are, or in an appropriate concentrated or dried form, or in the form of a mixture with appropriate additives. Since folic acids are not generally abundant in cell walls, it is possible to remove the remaining fragments of cell walls from the disrupted cells. Of course, included among the possible forms of the present invention is the addition of disrupted cells or cell extract to any known feed. Sows fed with such a feed exhibit improved breeding efficiency. Typical sow feed ingredients include corn, unpolished rice, rice bran, soybean lees, fish powder, palm kernel oil, calcium carbonate, D,L-methionine, L-lysine hydrochloride, etc. These and other sow feed ingredients are well known in the art, and the term "sow feed ingredient" refers to at least one of the listed or other well known feed components used to feed sows. Similarly, the various reduced forms of folic acid can be used individually, or two or more of them can be used in combination, and they can be directly orally administered to sows or added to feed fed to sows.

The feed additive for sows according to the present invention can be prepared in any appropriate dosage form, including concentrates, dried powders, granules, etc., with or without addition of appropriate carriers or the like. Such methodology is well known in the art.

A second embodiment of the present invention provides a feed for sows which is characterized in that the feed additive for sows according to the present invention is added thereto. Such a feed can be produced in accordance with any method known for the production of formula feeds, except that the feed additive according to the present invention is added thereto.

The feed additive for sows of the present invention is to be orally administered or added to feed in an amount such that the effects of improved breeding efficiency appear. 3, 5, 7, 10, 15, 25 40, 50, 60 and 70% breeding efficiency improvement is desirable. For example, the invention feed additive is dosed to sows in an amount which provides a total of 0.1 to 100 including 1, 5, 10, 20, 30, 40, 50, 60, 70, 80 and 90 µg, including all possible ranges therebetween of reduced forms of folic acid per kg of body weight per day. If the amount added is too small, no effects will be attained. The effects of the addition will not increase even if it is added in an amount greater than the above range and hence it will be useless. If the invention feed additive is added to a feed rather than orally administered the same amount of reduced forms of folic acid described above should be fed to the sow each day.

In a third embodiment of the present invention a method of improving the breeding efficiency of sows is provided characterized in that the feed additive for sows according to the present invention and described above is orally administered to the sows, or the sows are fed with a feed comprising the feed additive according to the present invention. All the conditions used in breeding the sows can be in accord with known prior methods, except that the amount of a reduced form of folic acid administered is 0.1 to 100 µg per kg of body weight of sows.

In a preferred method of breeding according to present invention, the duration of oral administration or feeding is as follows: since the purpose of administering the reduced form of folic acid is to bring safely to birth an increased number of the multiple embryos generated by fertilization in the interior of the womb of a sow, the oral intake of reduced form of folic acid is started at a time between about two months before mating (fertilization) and a time just after (i.e., 0, 1, 2, 3, 5 or 10 days) mating, with intake continued until the multiple embryos or fetuses are confirmed to have grown to a safe birth size or condition (for example, two months after mating), or up to their birth for the sake of safety.

The present invention will further be explained by the following examples. The invention is not limited by or to these examples, however.

EXAMPLE 1

(Effects of Administration of Leucovorin)

Tests were performed using two Gettingen mini-pigs of the same litter (0.7 years old pigs having a body weight of 15 kg; one for the test and one for comparison).

A 0.75% water suspension of leucovorin (produced by Sigma Co.) was orally force-fed (directly injected into the interior of the stomach through a fine flexible tube) to the test animal which had been fasted from the day before, in an amount of 50 mg per kg of body weight. For the purpose of comparison, the force-feeding was performed in exactly the same manner, except that folic acid (an oxidized form; produced by Kongo Kagaku Co.) was used in the corporation animal in place of leucovorin.

Blood samples were collected 1, 3, 6, 9 and 24 hours after the administration of the test substances, and two kinds of active-type folic acids, namely tetrahydrofolic acid (THF) and 5-methyltetrahydrofolic acid (5MF) contained in the blood plasmas of the pigs were quantitatively analyzed. As a control, blood was collected just before the administration of the test substances, and the blood was subjected to the same quantitative analysis (control).

Details of the quantitative analysis were as follows. To 0.2 ml of a collected blood sample was added 0.2 ml of 0.5M perchloric acid, and the resulting mixture was subjected to centrifugation of 5,000 g×2 min, to remove proteins. One hundred (100) µl of the supernatant obtained was subjected to high performance liquid chromatography. The analysis was performed using a column of "Phenyl-bonded phase 4.6 mmϕ×150 mm" (produced by Irica Co.). For mobile phase, a mixture of 97.5:2.5 (v/v) of 20 mm potassium acetate buffer (pH 3.6) and acetonitrile was used, and the flow rate was 0.8 ml/min. For the detection, "Electrochemical Detector Type E-502" (produced by Irica Co.) was used, and the determination was performed at a voltage of −300 mV. Results of the determination are shown in Table 1.

TABLE 1

| Time Lapsed (h) | Test | | Comparison | |
|---|---|---|---|---|
| | THF (*) | 5MF (*) | THF (*) | 5MF (*) |
| 0 (control) | 8.2 | 6.0 | 14.6 | 7.6 |
| 1 | 51.5 | 12.1 | 14.6 | 4.5 |
| 3 | 52.1 | 20.6 | 12.0 | 10.5 |
| 6 | 55.7 | 27.6 | 12.3 | 7.1 |
| 9 | 49.2 | 31.0 | 12.4 | 7.9 |
| 24 | 30.2 | 20.6 | 8.0 | 6.3 |

*: unit: ng/ml

As is apparent from Table 1, the concentration of THF in the animal's blood plasma increased immediately after the administration of leucovorin, and then the concentration of 5MF increased. The behavior of the two active-type folic acids in the blood is understandable since it is known that leucovorin changes to THF and then to 5MF during metabolism in organisms. The fact that the concentration of THF in blood plasma increased within 1 hour indicates that the absorption of leucovorin into the body proceeds quite smoothly. On the other hand, in the oral administration of folic acid (inactive type) carried out for comparison, no changes were observed in the values of active-type folic acids in the blood plasma of the animal.

EXAMPLE 2

(Effects of Administration of 7,8-Dihydrofolic Acid)

Tests were performed using two Gettingen mini-pigs of the same litter (2 years old pigs having a body weight of about 20 kg). 7,8-Dihydrofolic acid (produced by Sigma Co.) in 0.2 sodium ascorbate solution was orally force-fed to the test animals which had been fasted for 24 hours, in an amount of 1 mg or 0.2 mg per kg of body weight. Blood samples were collected after the administration, and active-type folic acids contained in the blood plasmas were quantitatively analyzed in the same manner as in Example 1.

The change in concentrations of THF and 5MF in the blood plasmas of the two pigs is shown in Table 2.

TABLE 2

| Time Lapsed (h) | 1 mg/kg | | 0.2 mg/kg | |
|---|---|---|---|---|
| | THF (*) | 5MF (*) | THF (*) | 5MF (*) |
| 0 (control) | 6.75 | 4.44 | 7.22 | 4.74 |
| 1 | 17.52 | 4.45 | 14.51 | 5.01 |
| 3 | 20.94 | 2.47 | 15.09 | 1.94 |
| 6 | 14.51 | 1.89 | 15.32 | 1.42 |
| 9 | 12.49 | 1.88 | 17.46 | 1.88 |
| 24 | 6.49 | 2.39 | 14.39 | 3.37 |

*: unit: ng/ml

As is understood from Table 2, the administration of 7,8-dihydrofolic acid leads to a remarkable increase of the THF concentration, although the 5MF concentration decreased to some extent.

EXAMPLE 3

(Effects of Administration of Liver Powders)

Example 1 was repeated except that a 50% water suspension of powders of pig liver was force-fed in an amount of 5 g of liver powder (which contained oxidized forms and reduced forms of folic acid in an amount of 0.08 mg in total) instead of the water suspension of leucovorin. The results of the comparison test in Example 1 are also utilized here.

Results are shown in Table 3.

TABLE 3

| Time Lapsed (h) | Test | | Comparison | |
|---|---|---|---|---|
| | THF (*) | 5MF (*) | THF (*) | 5MF (*) |
| 0 (control) | 11.9 | 5.5 | 14.6 | 7.6 |
| 1 | 24.5 | 28.3 | 14.6 | 4.5 |
| 3 | 26.4 | 22.7 | 12.0 | 10.5 |
| 6 | 24.4 | 14.8 | 12.3 | 7.1 |
| 9 | 24.6 | 13.3 | 12.4 | 7.9 |
| 24 | 14.8 | 11.8 | 8.0 | 6.3 |

*: unit: ng/ml

As is apparent from Table 3, in the test of liver powders, the concentration of THF increased quickly and the concentration of 5MF also increased. This is presumably because a large quantity of 5MF is contained in liver powders. On the other hand, in the comparison, as is mentioned in Example 1, no increase was observed in the concentration of 5MF and THF in the blood plasma. The absorption of active-type folic acids into the body here is extremely good, considering the fact that the content of folic acids in 5 g of liver powders is only 0.08 g (including inactive-type folic acids).

EXAMPLE 4

(Preparation of Disrupted Microorganism Cells)

(a) Cultivation of Microorganisms

Into 500 ml flasks was poured 50 ml each of a culture medium having the composition shown in Table 4 set forth below. After sterilization by heating, one platinum loopful of cells of each of the microorganisms shown in Table 5 were inoculated in the medium and cultured with shaking at 30° C. for 24 to 78 hours. The bacteria used were previously cultured on a bouillon agar medium at 30° C. for 24 hours, and the yeasts and molds used were previously cultured on a malt extract agar medium at 30° C. for 48 to 72 hours. After the culturing, cells were collected by centrifugation.

TABLE 4

| Components | Concentration |
|---|---|
| Glucose | 2.0 g/dl |
| Yeast Extract | 1.0 g/dl |
| Polypeptone | 1.0 g/dl |
| $(NH_4)_2SO_4$ | 0.5 g/dl |
| $K_2HPO_4$ | 0.3 g/dl |
| $KH_2PO_4$ | 0.1 g/dl |
| $MgSO_4 \cdot 7H_2O$ | 0.05 g/dl |
| $FeSO_4 \cdot 7H_2O$ | 0.001 g/dl |
| $MnSO_4 \cdot 4H_2O$ | 0.001 g/dl |
| pH 7.0 | |

TABLE 5

| | | Contents of Folic acids (mg/100 g) | |
|---|---|---|---|
| | Microorganisms | Before Disruption | After Disruption |
| Bacteria | Corynebacterium glutamicum ATCC 13869 | 2.0 | 12.0 |
| | Corynebacterium ammoniagenes ATCC 6871 | 1.3 | 8.9 |
| | Brevibacterium flavum ATCC 13826 | 2.8 | 14.2 |
| | Corynebacterium glutamicum ATCC 13032 | 1.5 | 10.8 |
| | Corynebacterium glutamicum ATCC 13060 | 3.5 | 9.0 |
| | Corynebacterium glutamicum ATCC 13952 | 1.6 | 5.6 |
| | Bacillus subtilis IFO 3009 | 0.9 | 4.7 |
| | Bacillus subtilis IFO 13169 | 2.8 | 8.3 |
| | Lactococcus lactis subsp. cremoris ATCC 19257 | 2.1 | 7.8 |
| Yeasts | Saccharomyces serevisiae IFO 2044 | 0.3 | 3.8 |
| | Saccharomyces cerevisiae IFO 2375 | 0.7 | 4.0 |
| | Candida utilis ATCC 9226 | 0.1 | 2.9 |
| Molds | Aspergillus oryzae IFO 30104 | 1.1 | 5.8 |
| | Aspergillus niger IFO 4414 | 1.6 | 7.6 |

(b) Preparation of Disrupted Microorganism Cells

The microorganisms so collected were suspended in physiological saline of a volume equal to the culture medium and then subjected to heat treatment (sterilization) at 100° C. for 10 minutes, and the cells were again collected by centrifugation. The cells were suspended into a 25 mM phosphate buffer (pH 7.0) at a concentration of 10% by wet weight.

With regard to the bacteria, 0.1% by weight of egg-white lysozyme (produced by Sigma Co.) and 0.2% by weight of papain (produced by Amano Pharmaceutical Co.) were added to the thus prepared suspensions of the cells, and the cell walls were digested and disrupted by maintaining the mixture at 37° C. for 12 hours, to obtain a disrupted cell liquid. With regard to the yeasts, 0.2% by weight of "Zymolyase 20T," a yeast cell wall digesting enzyme (produced by Seikagaku Kogyo K.K.), was added, and the cell walls were digested and disrupted by maintaining the mixture at 37° C. for 12 hours, to obtain a disrupted cell liquid. With regard to the molds, the suspensions of cells were added with the same quantity (by volume) of glass beads of 0.75 mmφ and the mixture was subjected 5 times to a 1 minute cell disruption treatment "Beads Beater" (produced by Biospec Co.) and then to decantation, to obtain a supernatant by removing glass beads.

Each of the thus obtained disrupted cell liquids and supernatant fluids of bacteria, yeasts and molds was dried by freeze-drying to obtain powders (one of the distribution forms of the sow feed additive according to the present invention).

(c) Determination of the Content of Folic Acids

The amount of folic acids contained per 100 g of the thus obtained dried powders was determined by means of a known bioassay using *Enterococcus hirae* ATCC 8043.

Results obtained are also shown in Table 5. In this bioassay, both the active-type folic acids (reduced forms) and inactive-type folic acids (oxidized forms) are determined at the same time to give their total amount. However, the value so determined may be regarded as mostly based on active-type folic acids since the folic acids contained in the dried powders are derived from microorganisms.

EXAMPLE 5

(Preparation of Mechanically Disrupted Cells of Microorganisms)

In a similar manner as in Example 3, *Corynebacterium glutamicum* ATCC 13869 and *Corynebacterium glutamicum* ATCC 13060 were cultured, and their cells were collected and suspended into 20 mM phosphate buffer (pH 7.0) at 10% by weight, to prepare cell suspensions.

The cell suspensions were admixed with the same quantity of glass beads of 0.1 mmφ, and the cells were completely disrupted by 10 1 minute disruption treatments using a "Beads Beater." Thereafter, resulting products were subjected to centrifugal separation, to separate cytoplasm fractions into centrifugal supernatants and the cell wall fractions into centrifugal residues.

Each of the fractions were dried by freeze-drying, and the amount of folic acids present in 100 g of dried products was determined by means of a bioassay as in Example 4.

Results obtained are shown in Table 6.

TABLE 6

| | Contents of Folic Acids (mg/100 g) | |
|---|---|---|
| Bacteria | Cytoplasm Fraction | Cell Wall Fraction |
| Corynebacterium glutamicum ATCC 13869 | 13.6 | 0.006 |
| Corynebacterium glutamicum ATCC 13060 | 11.2 | 0.008 |

It is understood from Table 6 that folic acids are present primarily in the cytoplasm fractions.

EXAMPLE 6

(Cultivation with Addition of Folic Acid Precursors)

In a similar manner as in Example 4, digested products (disrupted products) of cells were prepared by enzymatic treatment of cells using *Corynebacterium glutamicum* ATCC 13869 or *Corynebacterium glutamicum* ATCC 13060.

The cells used above were obtained by culturing the above bacteria with addition of 100 mg/liter of p-aminobenzoic acid, 10 mg/liter of folic acid (an oxidized form) or 100 mg/liter of guanosine. The content of folic acids contained in 100 g of dried powders is as shown in Table 7.

TABLE 7

| | Content of Folic Acids (mg/100 g) | | | | | |
|---|---|---|---|---|---|---|
| | Added with p-Aminobenzoic Acid Disruption treatment | | Added with Folic Acid Disruption treatment | | Added with Guanosine Disruption treatment | |
| Bacteria | before | after | before | after | before | after |
| Corynebacterium glutamicum ATCC 13869 | 4.2 | 23.0 | 3.4 | 21.9 | 3.0 | 18.5 |
| Corynebacterium glutamicum ATCC 13060 | 3.6 | 22.4 | 2.9 | 18.7 | 3.8 | 15.7 |

EXAMPLE 7

(Effects of Administration of Disrupted Microorganism Cells)

The effects of administering (1) the enzymatic digestion product of Corynebacterium glutamicum prepared in Example 4, (2) the enzymatic digestion product of Saccharomyces cerevisiae IFO 2044 prepared in Example 4, and (3) the enzymatic digestion product of Corynebacterium glutamicum ATCC 13869 (cells cultured with addition of p-aminobenzoic acid to the medium) were tested in a similar manner as in Example 1.

As test animals were used 4 Gettingen mini-pigs of the same litter (1 year old; body weight, 30 kg). The enzymatic digestion products were used in an amount of 50 mg dried product, per 1 kg of body weight. For the purpose of comparison, the same test was carried out by using 50 mg of inactive-type folic acid (produced by Kongo Kagaku K.K.) per 1 kg of body weight (comparison).

Results obtained are shown in Table 8.

TABLE 8

| Time Lapsed (H) | Test Enzymatically Digested Product | | | | | | Comparison Inactive-type Folic Acid | |
|---|---|---|---|---|---|---|---|---|
| | (1) | | (2) | | (3) | | | |
| | THF | 5MF | THF | 5MF | THF | 5MF | THF | 5MF |
| 0 (control) | 30.9 | 2.4 | 18.7 | 1.8 | 28.7 | 4.2 | 19.8 | 4.3 |
| 1 | 36.4 | 2.4 | 19.9 | 2.0 | 38.7 | 5.7 | 19.1 | 3.7 |
| 3 | 34.7 | 2.6 | 24.7 | 2.5 | 41.3 | 3.8 | 19.9 | 3.4 |
| 6 | 28.0 | 2.6 | 26.2 | 2.8 | 37.5 | 2.8 | 19.7 | 2.9 |
| 9 | 31.4 | 2.0 | 24.2 | 2.3 | 33.4 | 1.6 | 15.8 | 2.6 |
| 24 | 27.2 | 2.9 | 20.4 | 3.1 | 28.7 | 2.7 | 15.1 | 3.7 |

In the table, the amounts of THF and 5MF are shown in ng/ml.

As shown by Table 8 an increase in the value of THF in blood plasma was observed in each of enzymatic digestion products (1), (2) and (3), in comparison with those of the control (before administration). In cases (1) and (2), the concentration of THF increased quickly after administration. In case (2), the rate of increase in the concentration of THF was slow in comparison with (1) and (3). With regard to the extent of increase in the concentration of THF, (3) is higher than (1) and hence is more effective. An inactive-type folic acid (comparison) has no effect on increasing the concentration of THF and 5MF in blood plasma.

EXAMPLE 8

(Field Test)

60 sows (40 for testing and 20 for comparison) age, 1.5 to 4 years old; body weight, 150 to 200 kg of the LW species (a hybrid formed by cross-breeding Landrace species with Large Yorkshire species) were provided. The disrupted cells of Corynebacterium glutamicum ATCC 13869 (i.e., dried product of the enzymatically digested cells) prepared in Example 4 and the disrupted cells of the same strain (dried product of the cytoplasm fraction) prepared in Example 5 were used as active-type folic acid-containing products.

Starting 2 months before mating, 20 sows were continuously fed with a feed supplemented with the folic acid-containing disrupted product prepared in Example 4 in an amount of 300 mg per day per sow. 60 days after mating, the content of THF and 5MF in blood plasma was determined as in Example 1 (Test I).

A similar test was conducted with 20 sows on the disrupted cells prepared in Example 5 (Test II). For the purpose of comparison, a similar test was carried out without adding any disrupted cells (Comparison).

Results are shown in Table 9. As is understood from the table, the content of THF and of 5MF increase when sows are administered with the folic acid-containing products (Tests I and II) as compared with the comparison test.

TABLE 9

| | Test I | | | | Test II | | | | Comparison | | |
|---|---|---|---|---|---|---|---|---|---|---|---|
| Sow No. | THF | 5MF | Total | Sow No. | THF | 5MF | Total | Sow No. | THF | 5MF | Total |
| 1 | 7.7 | 0.7 | 8.4 | 21 | 4.5 | 1.1 | 5.6 | 41 | 2.3 | 0.0 | 2.3 |
| 2 | 10.1 | 0.9 | 11.0 | 22 | 3.0 | 1.6 | 4.6 | 42 | 3.0 | 0.0 | 3.0 |
| 3 | 5.8 | 1.4 | 7.2 | 23 | 6.8 | 1.2 | 8.0 | 43 | 2.4 | 0.5 | 2.9 |
| 4 | 2.3 | 0.0 | 2.3 | 24 | 2.9 | 0.8 | 3.7 | 44 | 2.9 | 1.2 | 4.1 |
| 5 | 3.2 | 0.4 | 3.6 | 25 | 5.0 | 1.6 | 6.6 | 45 | 1.8 | 0.4 | 2.2 |
| 6 | 3.4 | 0.0 | 3.4 | 26 | 11.2 | 1.2 | 13.4 | 46 | 4.6 | 0.6 | 5.2 |
| 7 | 4.6 | 0.4 | 5.0 | 27 | 4.4 | 0.6 | 5.0 | 47 | 3.2 | 0.8 | 4.0 |

TABLE 9-continued

| | Test I | | | | Test II | | | | Comparison | | |
|---|---|---|---|---|---|---|---|---|---|---|---|
| Sow No. | THF | 5MF | Total | Sow No. | THF | 5MF | Total | Sow No. | THF | 5MF | Total |
| 8 | 3.0 | 1.5 | 4.5 | 28 | 5.2 | 0.8 | 6.0 | 48 | 2.4 | 0.0 | 2.4 |
| 9 | 3.6 | 0.0 | 3.6 | 29 | 3.2 | 0.4 | 3.6 | 49 | 2.0 | 0.0 | 2.0 |
| 10 | 5.0 | 0.6 | 5.6 | 30 | 3.0 | 0.0 | 3.0 | 50 | 4.2 | 1.4 | 5.6 |
| 11 | 4.5 | 1.1 | 5.6 | 31 | 8.7 | 1.0 | 9.7 | 51 | 3.0 | 0.8 | 3.8 |
| 12 | 4.3 | 0.4 | 4.7 | 32 | 6.6 | 0.8 | 7.4 | 52 | 2.2 | 0.0 | 2.2 |
| 13 | 5.0 | 1.6 | 6.8 | 33 | 4.3 | 0.6 | 4.9 | 53 | 1.8 | 0.0 | 1.8 |
| 14 | 6.1 | 1.2 | 7.3 | 34 | 3.2 | 0.8 | 4.0 | 54 | 1.8 | 0.0 | 1.8 |
| 15 | 4.8 | 0.6 | 5.4 | 35 | 5.0 | 1.2 | 6.2 | 55 | 3.0 | 1.4 | 4.4 |
| 16 | 5.8 | 1.4 | 7.2 | 36 | 3.8 | 1.0 | 4.8 | 56 | 2.4 | 0.8 | 3.2 |
| 17 | 5.0 | 1.5 | 6.5 | 37 | 2.6 | 0.0 | 2.6 | 57 | 3.0 | 0.0 | 3.0 |
| 18 | 2.3 | 0.8 | 3.1 | 38 | 4.2 | 0.4 | 4.6 | 58 | 2.8 | 0.6 | 3.4 |
| 19 | 4.5 | 0.8 | 5.3 | 39 | 3.6 | 1.0 | 4.6 | 59 | 3.8 | 1.0 | 4.8 |
| 20 | 2.5 | 0.9 | 3.4 | 40 | 3.4 | 0.6 | 4.0 | 60 | 2.0 | 0.6 | 2.6 |

In each of the tests, the administration of active folic acids in the form of the disrupted cells of a microorganism was continued up to delivery.

All the sows delivered approximately 114 days after mating. The results of delivery were as follows: In the test administered with the enzymatically digested cells (Test I), 11.6 baby pigs were delivered in average, and in the test administered with the dried product of cytoplasmic fraction (Test II), 11.8 baby pigs were delivered in average. On the other hand, 10.8 baby pigs were delivered in average in the comparison test. The above results prove that the values of THF and 5MF in blood plasma of sows increase by administering the enzymatically digested cells and the dried products of cytoplasmic fractions (present invention), and that the efficiency of breeding can be improved thereby.

In accordance with the present invention, the concentration of active-type folic acids contained in blood plasma of sows can be increased through oral administration of a reduced form of folic acid or through feed supplementation with this agent and, as a result, the efficiency of sow breeding can be improved. This application is based on Japanese Patent Application No. 249405/1993, incorporated in its entirety herein by reference.

What is claimed as new and is desired to be secured by Letters Patent of the United States is:

1. A feed additive for sows comprising a sow feed ingredient and a reduced form of folic acid selected from the group consisting of 7,8-dihydrofolic acid, 5,6,7,8-tetrahydrofolic acid, 5-formyl-$H_4$-folic acid, 5,10-methylene-$H_4$-folic acid, 5-methenyl-$H_4$-folic acid, 10-formyl-$H_4$-folic acid and 5-formimino-$H_4$-folic acid.

2. A feed additive as claimed in claim 1, wherein said reduced form of folic acid comprises leucovorin, liver powders, or disrupted cells or cell extract of a microorganism.

3. A feed additive as claimed in claim 1, wherein said disrupted cells or cell extract of a microorganism is prepared from cells cultivated in a medium comprising p-aminobenzoic acid, an oxidized form of folic acid, and/or a nucleic acid.

4. A method for improving the efficiency of breeding of sows comprising orally administering a feed additive comprising a reduced form of folic acid selected from the group consisting of 7,8-dihydrofolic acid, 5,6,7,8-tetrahydrofolic acid, 5-formyl-$H_4$-folic acid, 5,10-methylene-$H_4$-folic acid, 5-methenyl-$H_4$-folic acid, 10-formyl-$H_4$-folic acid and 5-formimino-$H_4$-folic acid to a sow.

5. A method for improving the efficiency of breeding of sows comprising orally administering the feed additive claimed in claim 1 to a sow.

6. A method for improving the efficiency of breeding of sows comprising orally administering the feed additive claimed in claim 2 to a sow.

* * * * *